United States Patent Office 3,810,934
Patented May 14, 1974

3,810,934
PROCESS FOR THE PRODUCTION OF
CYANOACETYLCARBAMATES
Colm O'Murchu, Visp, Switzerland, assignor to
Lonza Ltd., Gampel, Valais, Switzerland
No Drawing. Filed Aug. 31, 1972, Ser. No. 285,357
Claims priority, application Switzerland, Sept. 24, 1971,
13,973/71
Int. Cl. C07c 121/02, 121/42, 121/52
U.S. Cl. 260—465 D                12 Claims

ABSTRACT OF THE DISCLOSURE

This invention involves a process of producing a $R_1$ substituted - N - cyanoacetyl-N-$R_2$ substituted-carbamate, which has the formula:

$$CNCH_2CONR_2COOR_1$$

wherein $R_1$ is a lower alkyl group having 1 to 10 carbon atoms, an aryl group, an aralkyl group or an alkaryl group, and wherein $R_2$ is a hydrogen atom, a lower alkyl group having 1 to 10 carbon atoms, an aryl group, an aralkyl group or an alkaryl group. The process includes reacting cyanoacetic acid with a $R_1$ substituted-N-$R_2$ substituted-carbamate which has the formula:

$$NHR_2COOR_1$$

wherein $R_1$ and and $R_2$ are defined as above. The reaction is conducted in the presence of phosphorus oxychloride, which is a condensation agent, and in the presence of at least one aprotic solvent and dimethylformamide. Examples of aprotic solvents are benzene, chloroform, toluene, ethyl acetate and acetonitrile. The cyanoacetyl carbamate is isolated from the reaction mass.

BACKGROUND OF THIS INVENTION (1) Field of this invention

This invention relates to a process for the production of cyanoacetylcarbamates from cyanoacetic acid and carbamates, with phosphorous oxychloride being used as a condensation agent.

(2) Prior art

It is known to react cyanoacetic acid with urethane in the presence of a condensation agent. The literature reveals two condensation agents. M. Conrad and A. Schulze, Reports of the German Chemical Society 42, 735 (1909), used acetic acid anhydride as a condensation agent in the above stated known process. The yield of cyanacetyl urethane was only 45 percent. M. R. Atkinson, G. Shaw and R. N. Warrener, J. Chem. Soc. 4118 (1956), used phosphorous oxychloride, POCl₃, as a condensation agent. The yield of cyanacetyl urethane was 75 percent. This process, regardless of which condensation agent is used, produces a product in low yield and having low purity, and has the additional disadvantages that the reaction mass cannot be stirred and that the removal of the end product from the reaction vessel is very difficult.

BROAD DESCRIPTION OF THIS INVENTION

An object of this invention is to avoid the above mentioned disadvantages of the known process and to obtain higher yields and purer end products then when the known processes are used.

This invention involves a process of producing a $R_1$ substituted - N - cyanoacetyl-N-$R_2$ substituted-carbamate, which has the formula:

$$CNCH_2CONR_2COOR_1$$

wherein $R_1$ is a lower alkyl group having 1 to 10 carbon atoms, an aryl group, an aralkyl group or an alkaryl group, and wherein $R_2$ is a hydrogen atom, a lower alkyl group having 1 to 10 carbon atoms, an aryl group, an alkaryl group or an aralkyl group. The process includes reacting cyanoacetic acid with a $R_1$ substituted-N-$R_2$ substituted-carbamate, which has the formula:

$$NHR_2COOR_1$$

wherein $R_1$ and $R_2$ are defined as above. The reaction is conducted in the presence of phosphorus oxychloride, which is a condensation agent, and in the presence of an aprotic solvent and dimethyl formamide. The product may be isolated from the reaction mass using any convenient method.

Product yields of 85 percent or greater are obtained by the process of this invention; in fact, yields as high as 91 percent are obtained. The product has a purity of at least 99 percent and often of almost 100 percent.

The use of the process of this invention results in higher yields than the use of the known processes. Furthermore, a purer product is obtained, the reaction can be stirred and the removal of the end product from the reaction vessel is relatively easy. The key to this invention is that the reaction is carried out in the presence of an aprotic solvent and dimethylformamide.

Preferably the aprotic solvent is used in a quantity of 150 to 300 ml. based upon one mole of cyanoacetic acid. Preferably the dimethylformamide is used in a quantity of 0.2 to 0.5 mole, based upon one mole of cyanoacetic acid. The reaction temperature is preferably between 65° and 75° C.

The cyanoacetyl carbamates produced by the process of this invention are useful as starting compounds for the production of compounds such as 5-cyanouracils, which is a growth inhibitor of microorganisms.

DETAILED DESCRIPTION OF THIS
INVENTION

I have found that the use of aprotic solvents by themselves improves the stirrability of the reaction mass, but that is must be worked with an excess of the carbamate. Also the product purity was only around 90 percent. Only when dimethylformamide was also used was there an increase in the reaction speed and was the excess $R_1$ substituted-N-$R_2$ substituted carbamate not needed. The dimethylformamide addition allowed the reaction temperature to be decreased from about 80° C. to 65° to 75° C. Further, when dimethylformamide was also used, the yield increased significantly and the purity of the product was almost 100 percent.

An aprotic solvent is a solvent as defined in Monograph 105 of the National Bureau of Standards. (Dimethylformamide is an aprotic solvent, so the term aprotic solvent as used herein is directed to all aprotic solvents except dimethylformamide.) Aprotic solvents are almost devoid of acidic or basic properties, for example, aprotic solvents do not interact strongly with acidic solutes, such as, carboxylic acids, phenols and mineral acids, or with basic solutes, such as, amines and derivatives of quanidine or pyridine. They are comparatively inert in character. Aprotic solvents are not masking or leveling solvents, such as, water. Indifferent solvents or inert solvents are other names for aprotic solvents. In general, aprotic solvents are organic compounds.

There are generally two classes of aprotic solvents. The most preferred class of aprotic solvents are termed dipolar aprotic solvents and generally have a high dielectric constant ($\epsilon$) that ranges from about 21 to about 46.5. The preferred aprotic solvent is dimethyl sulfoxide ($\epsilon=46$). Examples of other aprotic solvents in this class are acetone, acetonitrile, nitrobenzene, nitromethane, methyl sulfoxide, benzonitrile, nitromethane, dimethylacetamide, sulfolane (tetramethylenesulfone) N-methyl formamide, formamide, N-methyl propionamide, and mixtures thereof.

A second class of aprotic solvents generally have a dielectric constant in the range of about 2 to about 10. The aprotic solvents of this class generally are aliphatic hydrocarbons, aromatic hydrocarbons, and halogenated hydrocarbons. Such hydrocarbons can be saturated or unsaturated. Examples of such aprotic solvents are benzene, toluene, cyclohexane, o-xylene, m-xylene, p-xylene, 2,2,4-trimethylpentane, mesitylene, decahydronaphthalene, phenylacetylene, tetrahydronaphthalene, carbon tetrachloride, chloroform, chlorobenzene, benzotrifluoride, o-dichlorobenzene, dichloromethane, hexachloro-1,3-butadiene, and tetrachloroethylene.

Examples of mixtures of aprotic solvents are benzene-dimethylsulfoxide, carbon tetrachloride-acetonitrile carbon tetrachloride-nitrobenzene, benzene-acetonitrile and benzene-nitromethane. Examples of other aprotic solvents are drycleaning solvents, lubricants, motor oils, refrigerants and transformer oils.

The reaction can be conducted over a wider temperature range, but the reaction temperature is preferably 65° to 75° C. The reaction period is normally 90 to 120 minutes.

Preferably a slight molar excess of the $R_1$ substituted-N-$R_2$ substituted-carbamate is used, for example, the molar ratio of cyanoacetic acid to $R_1$ substituted-N-$R_2$ substituted-carbamate can be about 1 to 1.1. Preferably the aprotic solvent is used in a quantity of 150 to 300 ml., based on one mole of cyanoacetic acid. Broader ranges of aprotic solvent can be used, for example, 100 to 400 ml., based on the same thing. Preferably the dimethylformamide is used in a quantity of 0.2 to 0.5 mole, based upon one mole of cyanoacetic acid. Broader ranges of dimethylformamide can be used. Preferably about 0.3 to about 0.8 mole and most preferably about 0.52 mole of phosphorus oxychloride per mole of cyanoacetic acid is used. 0.1 to 1.0 mole of phosphorus oxychloride, on the same basis, for example, can be used. It is noted that the excellent results obtained by this invention are best obtained in the preferred ranges.

$R_1$ and $R_2$ can be a lower alkyl group containing one to 10 carbon atoms and can be a straight chain or branch chain alkyl group. Examples of $R_1$ and $R_2$ as used herein, which are lower alkyl groups containing 1 to 10 carbon atoms, are methyl, ethyl, n-propyl, isopropyl, n-butyl, isobutyl, n-pentyl, isopentyl, n-hexyl, n-heptyl, n-octyl, n-nonyl, n-decyl, neo-pentyl, 2,4-dimethyl-3-pentyl, 2-heptyl, 3-heptyl, 2-methyl-2-heptyl, 3-methyl-2-heptyl, 4-heptyl, 2,6-dimethyl-4-heptyl, 4-ethyl-4-heptyl, 2-methyl-1-heptyl, 4-methyl-4-heptyl, 3-methyl-4-heptyl, 4-propyl-4-heptyl, 4-methyl-1-heptyl, 2,2,3,3-tetramethyl butyl, 2,3-dimethyl pentyl, 2,2,4-trimethyl pentyl, 2,4-dimethyl-3-ethyl-3-hexyl, 2-ethyl-hexyl, 2-butyl, t-butyl, 2-methyl-1-butyl, 2-pentyl, 3-pentyl, 3-methyl-2-butyl, 2-methyl-2-butyl, 2-methyl-1-pentyl, 3-methyl-1-pentyl, 4-methyl-1-pentyl, 2-ethyl-1-butyl, t.-amyl, 2,3-dimethyl-1-butyl, 2-hexyl, 3-hexyl, 3-methyl-2-pentyl, 2,2-dimethyl-3-butyl, 4-methyl-2-pentyl, 2,3-dimethyl-2-butyl, 2-methyl-3-pentyl, 3-methyl-3-pentyl and 2-methyl-2-pentyl.

$R_1$ and $R_2$ can be any aryl group. Examples of $R_1$ and $R_2$, as used herein, which are aryl groups, are: a phenyl group, —$C_6H_5$; a naphthyl group, —$C_{10}H_7$; an anthryl group, —$C_{14}H_9$; a chrysyl group, —$C_{18}H_{11}$; a naphthacyl group; and a phenyl naphthyl group.

$R_1$ and $R_2$ can be alkaryl groups where the aryl group is substituted with lower alkyl groups, which are branched or straight-chain and which contain one to 10 carbon atoms. The alkyl groups can be any of the alkyl groups defined above as being useful for $R_1$ and $R_2$ when they are an alkyl group. The aryl groups can be any of the aryl groups defined above as being useful for $R_1$ and $R_2$ when they are an aryl group. Examples of alkaryl groups which $R_1$ and $R_2$ can be are: butylphenyl, 1-butyl-2-methylphenyl, 1,2-diethylphenyl, 1-butyl-3-methylphenyl, 1,3-diethylphenyl, 1-butyl-4-methylphenyl, 1,4-diethylphenyl, 1 - sec.-butyl - 4-methylphenyl, 1,2-diisopropylphenyl, 1,3 - diethyl - 5 - methylphenyl, 1,3-diisopropylphenyl, 1,4 - diisopropylphenyl, 1,2 - dimethylphenyl, 1,3-dimethylphenyl, 1,4-dimethylphenyl, 1,2-dimethyl-4-ethylphenyl, ethylphenyl, 1,3 - dimethyl - 5 - ethylphenyl, isopropylphenyl, 1,4-dimethyl-2-ethylphenyl, pentylphenyl, 2,4 - dimethyl - 1 - ethylphenyl, propylphenyl, 1-ethyl-4-isobutylphenyl, 1,2,3,4 - tetraethylphenyl, 1-ethyl-3-isopropylphenyl, 1,2,3,5 - tetraethylphenyl, 1-ethyl-4-isopropylphenyl 1,2,4,5-tetraethylphenyl, 1-ethyl-2-methylphenyl, 1-ethyl-3-methylphenyl, 1-ethyl-4-methylphenyl, 1 - ethyl-4-propylphenyl, 1-isopropyl-3-methylphenyl, (4-methyl-pentyl) phenyl, 1 - methyl - 3 - propylphenyl, 1-methyl-4-propylphenyl, 1,2,4-triethylphenyl, 1,2-dimethylnaphthyl, 1,3,5-triethylphenyl, 2,3-dimethylnaphthyl, 1,2,3-trimethylphenyl, 1-methylphenyl, 2-methylphenyl, 1-methylnaphthyl, 2 - methylnaphthyl, 1,2,5 - trimethylnaphthyl, 2,3,6-trimethylnaphthyl, 9-ethylanthryl, 1-methylanthryl, 2-methylanthryl, 9-methylanthryl, 1,3-dimethylanthryl, 2,3-dimethylanthryl, 1,2-dimethylchrysyl and 3-methylchrysyl.

$R_1$ and $R_2$ can be aralkyl groups where the alkyl groups are lower alkyl groups, which are branched or straight chain and which contain one to 10 carbon atoms. The alkyl groups can be any of the alkyl groups defined above as being useful for $R_1$ and $R_2$ when they are an alkyl group. The aryl groups can be any of the aryl groups defined above as being useful for $R_1$ and $R_2$ when they are an aryl group. Examples of aralkyl groups which $R_1$ and $R_2$ can be are: benzyl, butylbenzyl, naphthylbutyl, 1-ethyl-3-isopropyl benzyl and ethylbenzyl.

Examples of useful $R_1$ substituted-N-$R_2$ substituted-carbamates, where $R_2$ is a hydrogen atom, are methyl carbamate, urethane, n-propyl carbamate, isopropyl carbamate, n-butyl carbamate, isobutyl carbamate, n-amyl carbamate, isoamyl carbamate. Examples of useful $R_1$ substituted-N-$R_2$ substituted carbamates are phenyl-urethane, benzyl-N-phenyl carbamate, methyl-N-phenylcarbamate, N-ethylurethane, ethyl-N-methyl-carbamate, methyl - N-isobutyl-carbamate, isobutyl-N-phenyl-carbamate, n-butyl-N-phenyl-carbamate, isobutyl-N-phenyl carbamate, methyl-N-o-tolyl-carbamate, methyl-N-p-tolyl carbamate, phenyl-N-p-tolyl-carbamate, benzyl-N-p-tolyl carbamate, naphthyl-N-methyl-tolyl carbamate and o-xylyl-N-methyl-carbamate.

After the reaction period, the product can be isolated from the reaction mass by any convenient method. Two such convenient methods are presented in Examples 1 and 2.

The cyanoacetyl carbamates produced by the process of this invention are useful as starting compounds for the production of compounds such as 5-cyanuracils which is a growth inhibitor of microorganisms.

The following examples illustrate this invention. All percentages, ratios and parts in the examples in the rest of this application are on a weight basis, unless otherwise stated or obvious to one ordinarily skilled in the art.

EXAMPLE 1

1.0 mole of cyanoacetic acid, 1.1 mole of urethane (ethylcarbamate) and 0.52 mole of phosphorous oxychloride were placed in 200 gm. of toluene and 30 gm. of dimethylformamide. The admixture was heated for 90 minutes at a temperature of 70° to 73° C. The admixture was then cooled to room temperature. 400 gm. of water was poured into the resultant cold suspension. After subsequent filtration and drying, cyanoacetyl urethane was obtained in a yield of 91 percent, based on the starting cyanoacetic acid. The product had a purity of 100 percent.

EXAMPLE 2

0.5 mole of cyanoacetic acid, 0.55 mole of N-ethylurethane (ethyl-N-ethyl-carbamate) and 0.26 mole of POCl₃ were placed in 100 ml. of benzene and 15 gm. of dimethylformamide. The admixture was heated for 120 minutes at 70° C. The admixture was then cooled to room temperature. Then 200 gm. of cold water were poured into the resultant cold suspension. After separating the organic layer and distilling the benzene, N-cyanoacetyl-N-ethyl-urethane ($C_8H_{12}N_2O_3$, M.W. 184.2) was obtained in a yield of 85 percent. The product has a boiling point of 154.5° C. at 10 torr and had a purity of 99 percent.

Calculated (percent): C, 52.1; H, 6.52; N, 15.2. Found (percent): C, 51.7; H, 6.5; N, 14.7.

EXAMPLE 3

0.5 mole of cyanoacetic acid, 0.55 mole of methylcarbamate and 0.26 mole of POCl₃ was dissolved in 100 ml. of chloroform and 15 gm. of dimethylformamide. The admixture was heated for 90 minutes to 70° C. After further processing according to Example 1, methyl-N-cyanoacetyl carbamate ($C_5H_6N_2O_3$) was obtained in a yield of 85.5 percent. The product had a purity of 99 percent and had a melting point of 174° C.

An analysis of the product was.—Calculated (percent): C, 42.3; H, 4.22; N, 19.7. Found (percent): C, 42.2; H, 4.2; N, 19.9.

EXAMPLE 4

Example 1 was repeated except that a reaction temperature of 65° C. was used. The product was obtained in a very high yield and had a very high purity.

EXAMPLE 5

Example 1 was repeated except that a reaction temperature of 75° C. was used. The product was obtained in a very high yield and had a very high purity.

EXAMPLE 6

Example 1 was repeated except that 1.0 mole of urethane was used. The product was obtained in a very high yield and had a very high purity.

EXAMPLE 7

Example 1 was repeated except that 1.2 mole of urethane was used. The product was obtained in a very high yield and had a very high purity.

EXAMPLE 8

Example 1 was repeated except that 0.95 mole of urethane was used. The product was obtained in a very high yield and had a very high purity.

EXAMPLE 9

Example 2 was repeated except that 75 ml. of benzene was used. The product was obtained in a very high yield and had a very high purity.

EXAMPLE 10

Example 2 was repeated except that 150 ml. of benzene was used. The product was obtained in a very high yield and had a very high purity.

EXAMPLE 11

Example 1 was repeated except that 0.3 mole of phosphorous oxychloride was used. The product was obtained in a very high yield and had a very high purity.

EXAMPLE 12

Example 1 was repeated except that 0.8 mole of phosphorous oxychloride was used. The product was obtained in a very high yield and had a very high purity.

EXAMPLE 13

Example 1 was repeated except that 36.5 gm. of dimethylformamide was used. The product was obtained in a very high yield and had a very high purity.

EXAMPLE 14

Example 1 was repeated except that 14.6 gm. of dimethylformamide was used. The product was obtained in a very high yield and had a very high purity.

EXAMPLE 15

Example 2 was repeated except that the urethane was replaced with an equal molar amount of methyl-N-methylcarbamate. The product was obtained in a very high yield and had a very high purity.

EXAMPLE 16

Example 1 was repeated except that the urethane was replaced with an equal molar amount of phenyl-N-phenylcarbamate. The product was obtained in a very high yield and had a very high purity.

EXAMPLE 17

Example 1 was repeated except that the urethane was replaced with an equal molar amount of benzyl-N-methylphenyl-carbamate. The product was obtained in a very high yield and had a very high purity.

EXAMPLE 18

Example 1 was repeated except that the urethane was replaced with an equal molar amount of methyl-N-methylbenzyl-carbamate. The product was obtained in a very high yield and had a very high purity.

EXAMPLE 19

Example 1 was repeated except that the urethane was replaced with an equal molar amount of octyl-N-isobutyl-carbamate. The product was obtained in a very high yield and had a very high purity.

What is claimed is:

1. The process of producing a $R_1$ substituted-N-cyanoacetyl-N-$R_2$ substituted-carbamate, which has the formula:

$$CNCH_2CONR_2COOR_1$$

wherein $R_1$ is a lower alkyl group having 1 to 10 carbon atoms, an aryl group which has 6 to 18 carbon atoms, an aralkyl group wherein the aryl group has 6 to 18 carbon atoms and the alkyl group has 1 to 10 carbon atoms, or an alkaryl group wherein the aryl group has 6 to 18 carbon atoms and the alkyl group has 1 to 10 carbon atoms, and wherein $R_2$ is a hydrogen atom, a lower alkyl group having 1 to 10 carbon atoms, an aryl group which has 6 to 18 carbon atoms, an aralkyl group wherein the aryl group has 6 to 18 carbon atoms and the alkyl group has 1 to 10 carbon atoms, or an alkaryl group wherein the aryl group has 6 to 18 carbon atoms, and the alkyl group has 1 to 10 carbon atoms, which comprises reacting cyanoacetic acid with a $R_1$ substituted-N-$R_2$ substituted carbamate, which has the formula:

$$NHR_2COOR_1$$

wherein $R_1$ and $R_2$ are defined as above, in the presence of phosphorous oxychloride, which is a condensation agent, and in the presence of dimethylformamide and at least one aprotic solvent other than dimethylformamide, said aprotic solvent being used in an amount between about 150 to 300 ml., based upon one mole of said cyanoacetic acid, said dimethylformamide being used in an amount between about 0.2 and about 0.5 mole, based upon one mole of said cyanoacetic acid, and said aprotic solvent being selected from the group consisting of an aprotic solvent having a dielectric constant between about 2 and about 10, an aprotic solvent having a dielectric constant between about 21 and about 46.5, and mixtures thereof.

2. The process as described in claim 1 wherein said aprotic solvent is benzene, chloroform, toluene, ethyl acetate or acetonitrile.

3. The process as described in claim 1 wherein said reaction is conducted at a temperature of 65° to 75° C.

4. The process as described in claim 1 wherein said $R_2$ is a hydrogen atom and $R_1$ is a lower alkyl group having 1 to 8 carbon atoms.

5. The process as described in claim 1 wherein $R_1$ and $R_2$ each is an alkyl group having 1 to 8 carbon atoms.

6. The process as described in claim 1 wherein said $R_1$ substituted-N-$R_2$ substituted-carbamate is urethane.

7. The process as described in claim 1 wherein said $R_1$ substituted-N-$R_2$ substituted-carbamate is N-ethyl urethane.

8. The process as described in claim 1 wherein said $R_1$ substituted-N-$R_2$ substituted-carbamate is methyl N-cyanoacetylcarbamate.

9. The process as described in claim 1 wherein said $R_1$-substituted-N-cyanoacetyl-N-$R_2$ substituted-carbamate is isolated from the reaction mixture.

10. The process as described in claim 1 wherein $R_1$ and $R_2$ each is an aryl group which is a phenyl group, a naphthyl group, an anthryl group, a chrysyl group, a naphthacyl group or a phenylnaphthyl group.

11. The process as described in claim 1 wherein 0.3 to 0.8 mole of phosphorous oxychloride, based upon one mole of said cyanoacetic acid, is used.

12. The process as described in claim 1 wherein the duration of the reaction is 90 to 120 minutes.

References Cited

Shaw, J. Chem. Soc., 1955, pp. 1834–1840.
Atkinson et al., J. Chem. Soc., 1956, pp. 4118–4123.
Ralph et al., J. Chem. Soc., 1956 pp. 1877–1880.
Adams et al., Chem. Rev., vol. 65, October 1965, p. 577.

JOSEPH P. BRUST, Primary Examiner

U.S. Cl. X.R.

260—465.4